United States Patent [19]

Crane et al.

[11] Patent Number: 4,980,569

[45] Date of Patent: Dec. 25, 1990

[54] SECURITY PAPER VERIFICATION DEVICE

[76] Inventors: Timothy T. Crane, Box 78, Dalton, Mass. 01226; Richard A. Menelly, 87 Belden Rd., Burlington, Conn. 06013; Robert J. Danek, Hendee Rd., R.F.D. #1, Andover, Conn. 06232

[21] Appl. No.: 488,230

[22] Filed: Mar. 5, 1990

[51] Int. Cl.[5] .............................................. G06K 5/00

[52] U.S. Cl. ..................................... 250/556; 283/85; 356/71

[58] Field of Search .................... 250/556; 283/85, 91; 356/61

[56] References Cited

U.S. PATENT DOCUMENTS 4,370,057 1/1983 Lee ........................................ 356/71
4,451,530 5/1984 Kaule et al. ........................... 356/71
4,524,276 6/1985 Ohtombe ............................... 356/71
4,652,015 3/1987 Crane .................................... 283/91
4,723,072 2/1988 Naruse ................................ 250/556
4,761,205 8/1988 Crane .

*Primary Examiner*—Edward P. Westin

[57] ABSTRACT

A photodiode and phototransistor are positioned on one side of a document subjected to verification for authenticity under both transmitted and reflected light. A corresponding photodiode and phototransistor on the opposite side of the document are arranged for receiving the light transmitted through the currency if the security feature is not present. A logic circuit determines the presence or absence of the security feature and correspondingly provides visual or audible indication thereof. The photodiodes, phototransistors and circuit are arranged within an enclosure that is attached to a currency receiving device such as a cash register. The visual or audible indicators are mounted on the cash register for immediate indication of the currency verification to the cashier.

21 Claims, 3 Drawing Sheets

FIG. 2
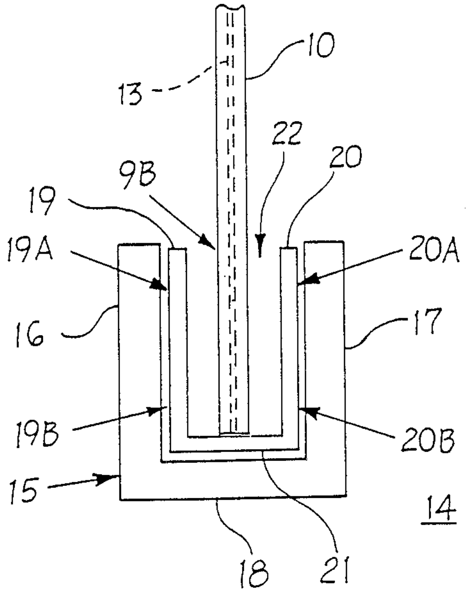
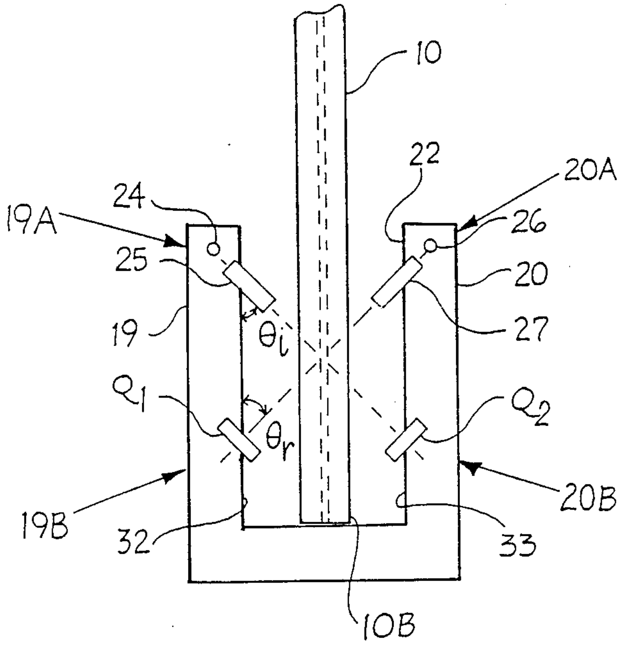
FIG. 3B

SECURITY PAPER VERIFICATION DEVICE

BACKGROUND OF THE INVENTION

The use of a metallized plastic strip embedded within currency paper as a security thread for counterfeit deterrence is described within U.S. Pat. Nos. 4,652,015 and 4,761,205, which Patents are incorporated herein for purposes of reference. The security thread is virtually undetected under reflected light while being readily discerned under transmitted light to verify its presence.

In commercial situations where verification of currency bills is required, the receiver of the currency bill should subject the currency to a relatively intense light source to detect the security thread under transmitted light. With large queues of customers at a bank or supermarket, as well as in places of low level illumination such as bars and restaurants it is difficult to visually inspect the corresponding large number of currency bills. It would be advantageous therefore to have some means of automatically determining the presence of the requisite security thread and confirming authenticity to the teller or cashier.

U.S. Pat. No. 4,524,276 entitled "Apparatus for Detecting a Security Thread Embedded in a Paper-Like Material" describes an infrared radiation source and two infrared radiation detectors used to determine whether or not a security threads is embedded in the paper-like material and also what the detected security material is made of.

Countries outside of the United States that employ plastic or metal security threads embedded in their paper currency, require that the presence of such security threads be ascertained under transmitted light such as described in the aforementioned U.S. Pat. No. 4,524,276. In accordance with the United States requirement that the currency security thread be detected under transmitted light and not seen under reflected light, both reflective and transmissive determinations must be made for complete verification of the currency.

One purpose of the instant invention therefore, is to provide automatic means for determining currency verification by both reflective and transmissive tests and for providing immediate indication of the results thereof.

SUMMARY OF THE INVENTION

A photodiode and phototransistor array is arranged on one side of paper currency while a corresponding phototransistor array is arranged on an opposite side thereof. Upon energizing a selected photodiode, an associated logic circuit determines whether the associated phototransistors on both sides of the paper appropriately respond thereto. Indication of PASS or FAILURE is provided by means of red and green photo indicators.

BRIEF DESCRIPTION OF THE DRAWINGS

FIG. 2 is an end view of an edge-testing embodiment of the verification device in accordance with the invention;

FIG. 3B is an enlarged end view of the printed wire boards of the edge-testing embodiment of FIG. 2 detailing the positioning of the optical components;

DESCRIPTION OF THE PREFERRED EMBODIMENT

Figure 1:
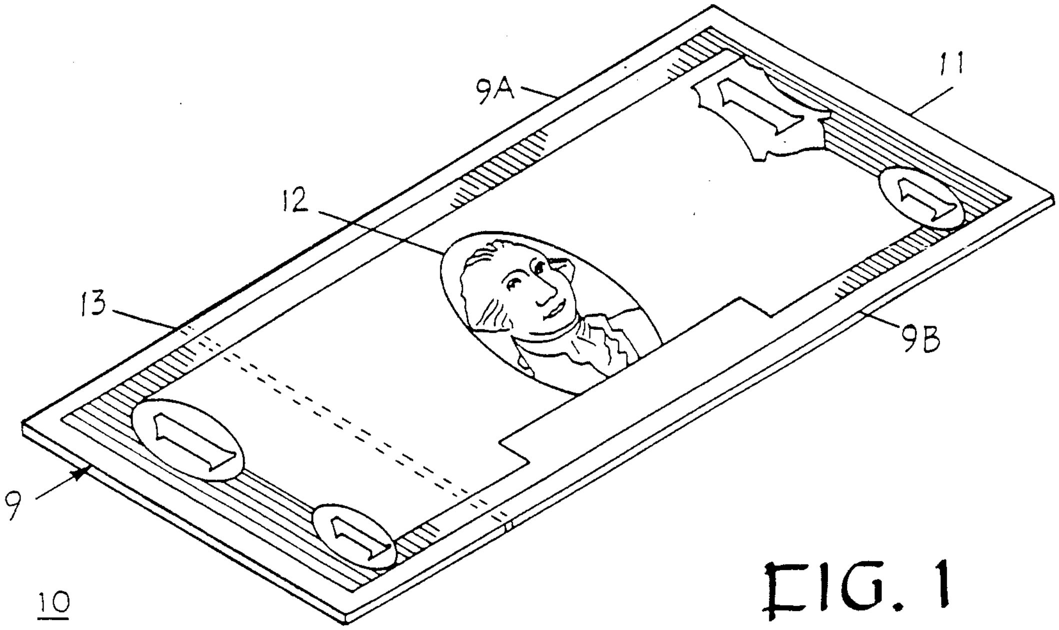
FIG. 1 is a top perspective view of a U.S. currency bill employing a metallized security thread.

FIG. 1 depicts one type of United States currency 10 consisting of a paper bill 11 having the indicia 12 of a United States president or the like and including a security thread 13 embedded therein. The bill is selectively color printed to enhance the various features printed on both sides of the bill except for a boarder 9 which retains the basically "white" color of the currency paper prior to printing. It is noted that the security thread extends transversely across the linear extent of the bill from the top border 9A to the bottom border 9B. The security thread is introduced within the paper in the manner described within U.S. Pat. Nos. 4,652,015 and 4,761,205 which Patents are incorporated herein for purposes of reference. The security thread is of the type consisting of a metallized plastic film that is virtually invisible in reflected light and readily apparent under transmitted light. In order to verify the authenticity of such currency, a two-fold test must be performed, whereby the security thread must not be detected upon reflected light and, on the other hand, must be detected under transmitted light.

Figure 3A:
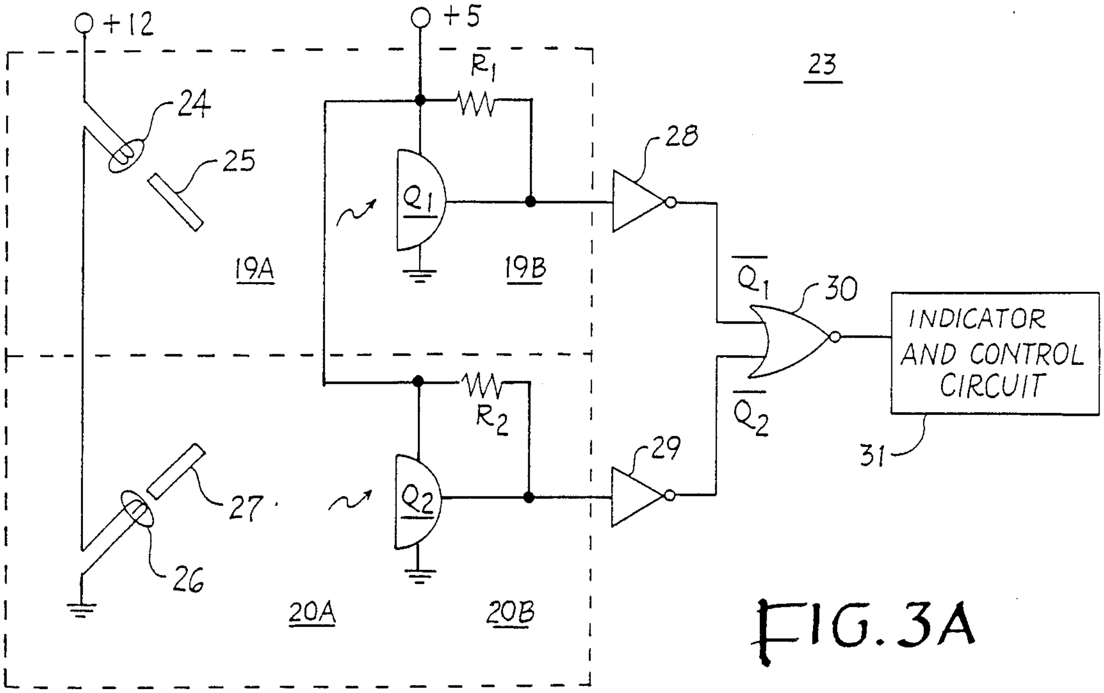
FIG. 3A is a diagrammatic representation of the circuit components contained within the verification device of FIG. 4.

A simple verification device 14, shown in FIG. 2, consists of a U-shaped metal or plastic case 15 with two upstanding sidewalls 16, 17 joined by a bottom 18. A pair of printed wire boards 19, 20 joined by means of a bottom 21 are inserted within the case. Currency verification is achieved by inserting the currency 10 within the slot 22 formed within the printed wire boards between the two sidewalls such that the currency stops against the bottom 21 of the printed wire boards. The optically active parts 19A, 19B, 20A, 20B of the printed wire boards are arranged such that the bottom border 9B of the currency sits intermediate the optically active parts. This, in turn, assures that the part of the security thread 13 that extends to the border will lie between the optically active parts of the printed wire boards. The verification circuit 23 contained on the printed wire boards is shown in FIG. 3A. A high intensity light source 24 in the form of a light emitting diode or a "grain of wheat" lamp within the optically active part 19A is optically coupled by means of an optical fiber 25 with a photo detector $Q_1$ in the optically active part 19B as well as with the photo detector $Q_2$ in the optically active part 20B. A similar high intensity light source 26 in the optically active part 20A is optically coupled by means of a similar optical fiber 27 with the photo detector $Q_1$ and the photo detector $Q_2$. Both photo detectors $Q_1$, $Q_2$ are in the form of a photo transistor-schmitt trigger device having a digital output such as a type MRD750 obtained from the Motorola Corporation. The outputs of the photo detectors are connected through a pair of inverter gates 28, 29 to provide the inputs $Q_1$, $Q_2$ of a NOR gate 30. The output of the NOR gate is connected to an indicator circuit 31 which includes light-emitting diodes, audible indicating devices and control circuitry as desired. A pair of bias resistors $R_1$, $R_2$ connect between the 5 volt power source and the outputs of the photo detectors $Q_1$, $Q_2$ for adjustment purposes.

The operation of the verification circuit 23 is best seen by referring to both FIGS. 3A and the following logic table where a "1" indicates the presence of light and a "0" indicates the absence of light seen at the input to the NOR gate 30. The inverter gates 28, 29 invert the logic outputs from $Q_1$, $Q_2$ thereby generating the inverted outputs $\overline{Q}_1$, $\overline{Q}_2$ as indicated in the following Logic Table. The resulting logic inputted to the NOR gate generates a logic "1" for a PASS condition and a logic "0" for a FAIL condition.

LOGIC TABLE

| $\overline{Q}_1$ | $\overline{Q}_2$ | NOR GATE OUTPUT |
|---|---|---|
| 0 | 0 | 1 |
| 0 | 1 | 0 |
| 1 | 0 | 0 |
| 1 | 1 | 0 |

Upon insertion of the currency 10, as shown earlier in FIG. 2, the presence of the security thread intercepts and blocks the light transmitted from the light source 26 to photo detector $Q_1$ resulting in a "0" input to NOR gate 30 at the $\overline{Q}_1$ input while, at the same time, blocking the light from light source 24 to photo detector $Q_2$ resulting in a "0" input to NOR gate 30 at the $\overline{Q}_2$ input. At this time, a logic "1" appears at the output of NOR gate 30 and is inputted to the indicator and control circuit 31. In order to determine whether the security thread is on the outer surface of the currency, i.e. "COUNTERFEIT" and not within the currency, "GENUINE" as indicated at 13 in FIG. 2, the photo detector $Q_1$ should not receive any reflected light from light source 24 and the photo detector $Q_2$ should not receive any reflected light from the light source 26. The presence of a "1" at either input to NOR gate 30 accordingly indicates the presence of a counterfeit security thread on either, or both of the outer surfaces of the currency. Referring again to the logic table it is noted that the indication of a logic "1" at $\overline{Q}_1$ or $\overline{Q}_2$ under reflected light results in a "0" output from the NOR gate 30 to the indicator circuit 31 which include latching circuitry and indicator lamps whereby the currency is indicated as counterfeit. In order for the currency to be indicated as genuine, there should be no light received at either of the photo detectors to thereby indicate that the security thread is present and is not counterfeit.

The critical positional relationship between the light source 24 and photo detector $Q_1$ within the optically active parts 19A, 19B and between the light source 26 and photo detector $Q_2$ in the optically active parts 20A, 20B of the printed wire boards 19, 20 is best seen by now referring to FIG. 3B wherein the currency 10 is depicted within the slot 22 formed between the two printed wire boards. The angle of incidence for light emanating from light source 24 relative to the outer surface of the currency is set by the angle $\Theta i$ between the optical fiber 25 and the top surface 32 of the printed wire board 19. The top surface of the currency is set parallel to the top surface of the printed wire board by means of transparent spacers (not shown). The angle of reflection $\Theta r$ between photo detector $Q_1$ and the top surface of the printed wire board is set equal to the angle of incidence $\Theta i$ such that any light specularly reflected from the top surface of the currency will reflect back to photo detector $Q_1$ resulting in a logic "1" input to the NOR gate. A similar positional relationship between the light source 26 and the photo detector $Q_2$ in the printed wire board 19 is also set by the angles of the optical fiber 27 and the photo detector $Q_2$ relative to the surface 33 of the printed wire board 20.

Figure 4:
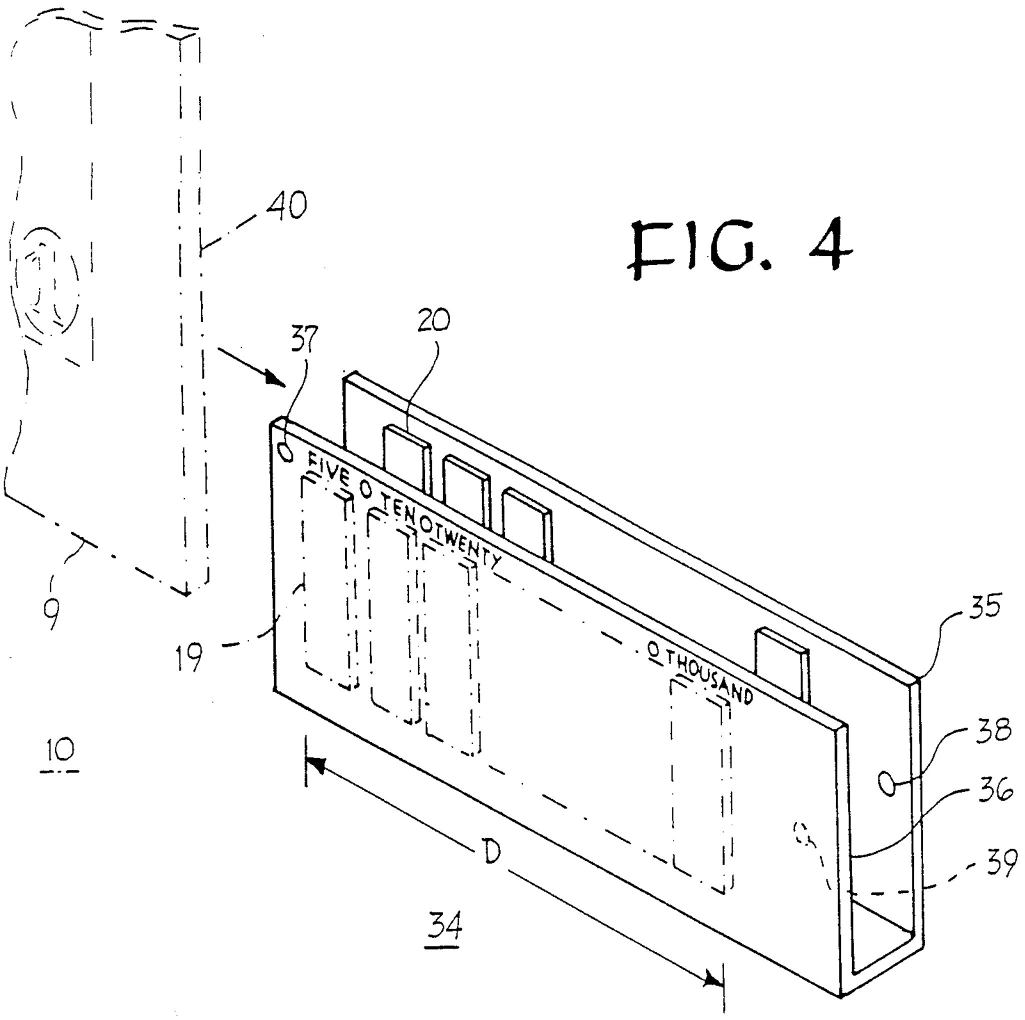
FIG. 4 is a top perspective view of a multi-denomination verification device according to the invention.

A multi-denominational currency verifier device 34 is shown in FIG. 4 to consist of a pair of metal or plastic upstanding sidewalls 35, 36 each containing a plurality of opposing printed wire boards 19, 20 similar to those described earlier with reference to FIGS. 2–3B. The individual printed wire boards have associated indicator lamps 37 which correspond to the denomination of the currency 10 shown in phantom prior to insertion within the verifier device. In the event that the security threads are positionally located at different locations along the lateral extent of the currency, the printed wire boards would be similarly located along the verifier device to insure that the correct currency is verified. To fix the distance D from the leading edge 40 of the currency 10 to the require printed wire boards, a light-emitter 38 and light detector 39 energize and activate the corresponding printed wire board relative to the location of the corresponding security thread within the various currency denominations. The lagging edge of the border 9 can also be used to set the positional relationship between the currency denominations and the corresponding printed wire boards, if so desired. With additional circuitry, the multi-currency verification device 34 could be used for verification, sorting and counting purposes.

Figure 5:
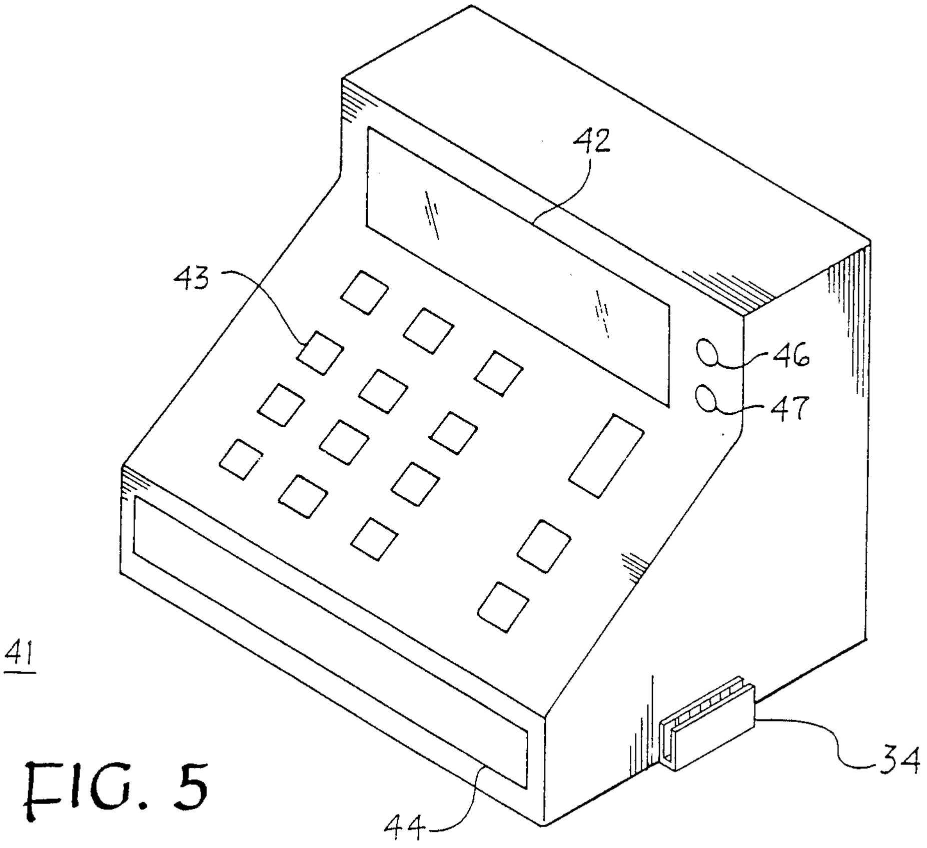
FIG. 5 is a front perspective view of a cash receiver including the verification device according to the invention.

The multi-denominational verification device 34 can also be used with a cash receiver such as the cash register 41 shown in FIG. 5 with the verification device attached to the cash register next to the cash drawer 44. The indication and control circuit 31 of FIG. 3A could provide electromagnetic as well as electromechanical interlock with the cash register so that the cash receiver drawer would not open in the event that counterfeit currency is detected within the verification device. The cash register is of the type using a keypad 43 and a display 42 to depict the price of goods being purchased as well as the denomination of the cash proffered by the customer. The same display could automatically register the denomination of the genuine currency within the verification device or, a green light-emitting diode 46 could provide visual indication of genuine currency whereas a red light-emitting diode 47 could indicate the presence of counterfeit currency. The currency that failed the currency verification device could be set aside for separate verification by means of an intense light source whereby the operator would then examine both surfaces of the currency under reflected light to determine whether there is a counterfeit security thread on the surface and then examine the currency under transmitted light to see whether a genuine security thread is embedded within the paper, as described earlier. The outputs of the verification device could be connected in feedback relation with a microprocessor within the cash register control circuit to count the change from the cash drawer to speed up the transaction, if so desired.

Having thus described our invention, what we claim as new and desire to seek by Letters Patent is:

1. Apparatus for determining the presence of security threads in paper comprising:

means for receiving an edge of a paper containing a security thread;

a first light source on one side of said edge providing first illumination to said one side;

a second light source on an opposite side of said edge providing second illumination to said opposite side;

a first light detector on said one side receiving first reflected light from said first light source and second transmitted light from said second light source;

a second light detector on said opposite side receiving second reflected light from said second light source and first transmitted light from said first light source; and circuit means connected with said first light source and detector and said second light source and detector whereby said circuit provides a first output signal when no reflected or transmitted light is received by said first and second light detectors and a second output signal when reflected or transmitted light is received by said first or second detectors.

2. The apparatus of claim 1 wherein said first and second light source comprise light emitting diodes.

3. The apparatus of claim wherein said first and second light detectors comprise phototransistors.

4. The apparatus of claim 1 wherein said receiving means comprises a slotted container adapted to receive said edge within said slot.

5. The apparatus of claim 1 wherein said first and second light sources and detectors are mounted on a printed wire board.

6. The apparatus of claim 5 including a first optical fiber intermediate said first light source and said edge.

7. The apparatus of claim 6 wherein said optical fiber is arranged at a predetermined angle to a first surface and said first light detector is arranged at said same angle relative to said first surface.

8. The apparatus of claim 1 wherein said paper comprises currency including a rectangular printed part and a perimetric unprinted part.

9. The apparatus of claim 8 wherein said edge comprises said perimetric unprinted part.

10. The apparatus of claim 1 wherein said circuit means comprises a pair of inverter GATES connected with said first and second light sources.

11. The apparatus of claim 10 including a NOR GATE connected to said inverter GATES.

12. The apparatus of claim 1 including a pair of indicator lamps connected with said circuit means for providing indication of said first and second signals.

13. The apparatus of claim 5 wherein said printed wire board is slotted to fit within said slotted container.

14. The apparatus of claim 5 wherein said slotted container is attached to a cash receiver.

15. The apparatus of claim 14 wherein said cash receiver comprises a cash register.

16. The apparatus of claim 14 wherein said indicator lamps are mounted on said cash register.

17. The apparatus of claim 16 including electromagnetic means connecting with a cash drawer on said cash register to prevent operation of said cash drawer when said second signal is outputted from said comparator means.

18. The apparatus of claim 17 including means for determining the position of said security thread relative to an end of said currency paper.

19. Apparatus for determining the presence of security threads in paper comprising:

means for receiving an edge of a paper containing a security thread;

a first light source on one side of said edge providing first illumination to said one side;

a second light source on an opposite side of said edge providing second illumination to said opposite side;

a first light detector on said one side receiving first reflected light from said first light source and second transmitted light from said second light source;

a second light detector on said opposite side receiving second reflected light from said second light source and first transmitted light from said first light source; and circuit means connected with said first light source and detector and said second light source and detector whereby said circuit provides a first output signal when no reflected and no transmitted light is received by said first and second light detectors and a second output signal when reflected or transmitted light is received by said first and second detectors.

20. A method for determining the presence of a security thread within currency paper comprising the steps of:

providing a first light source on one side of a currency paper containing a security thread;

providing a second light source on an opposite side of said currency paper;

arranging a first light detector on said one side;

arranging a second light detector on said opposite side;

providing a first output signal when no reflected or transmitted light is received by said first and second light detector and providing a second output signal when reflected or transmitted light is received by said first or second light detectors.

21. A method for determining the presence of a security thread within currency paper comprising the steps of:

providing a first light source on one side of a currency paper containing a security thread;

providing a second light source on an opposite side of said currency paper;

arranging a first light detector on said one side;

arranging a second light detector on said opposite side;

providing a first output signal when no reflected or transmitted light is received by said first and second light detectors and providing a second output signal when reflected or transmitted light is received by said first and second light detectors.

* * * * *